Dec. 22, 1959    A. H. PINKE    2,918,082
PRESSURE REGULATING DEVICE
Filed Feb. 21, 1955
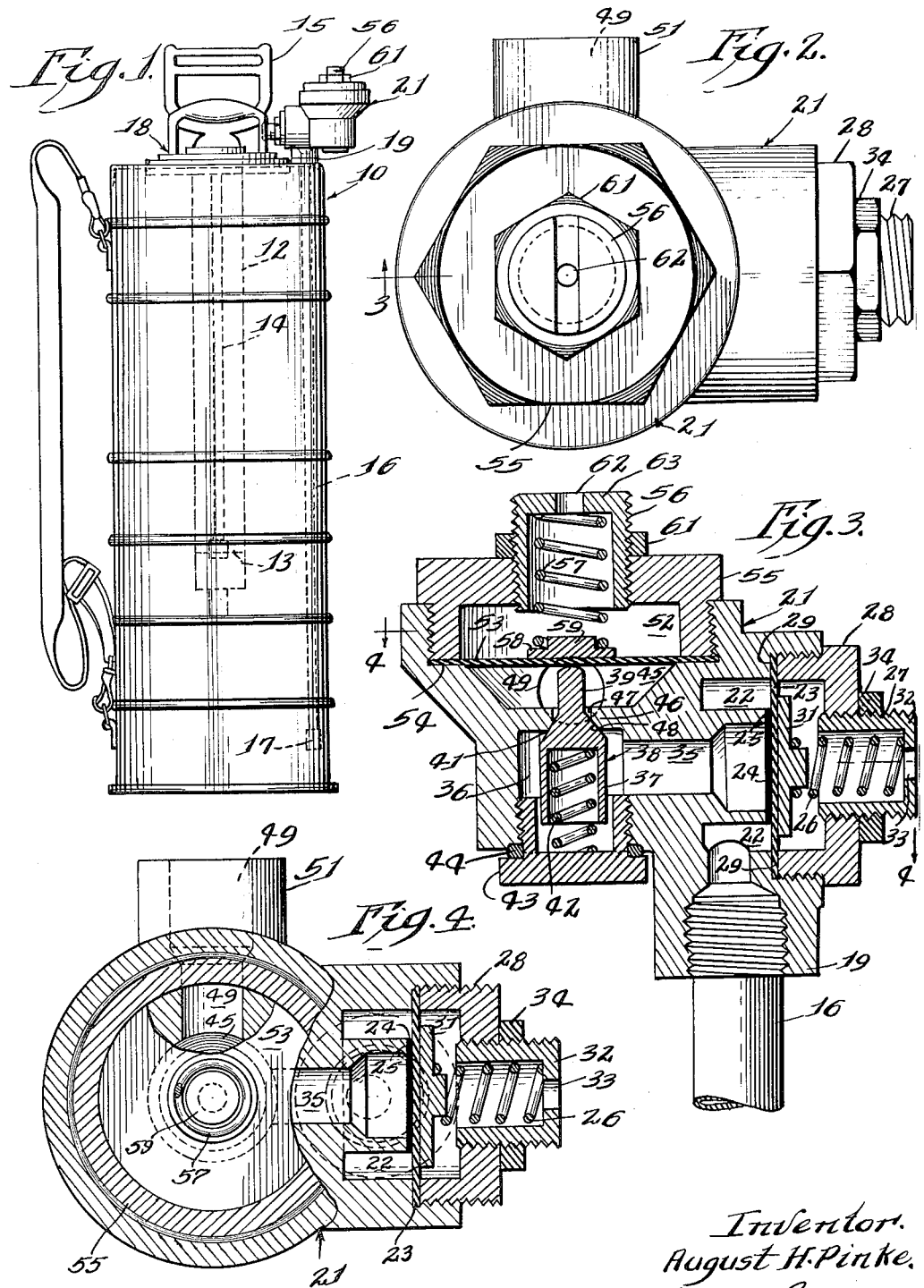
Inventor.
August H. Pinke.
By Wilson & Geffert
Attorneys.

United States Patent Office
2,918,082
Patented Dec. 22, 1959

2,918,082

PRESSURE REGULATING DEVICE

August H. Pinke, Hastings, Minn., assignor to H. D. Hudson Manufacturing Company, Chicago, Ill., a corporation of Minnesota Application February 21, 1955, Serial No. 489,504

3 Claims. (Cl. 137—505.42)

The present invention relates to a novel pressure regulating device or mechanism adapted to be inserted into a fluid discharge line carrying fluid under pressure for positively controlling the pressure of the discharged fluid and providing a positive shut-off when the pressure in the supply line decreases below a predetermined value.

Among the objects of the present invention is the provision of a novel pressure regulating device capable of controlling and maintaining at a predetermined pressure the fluid being transmitted therethrough, and in the event the pressure in the supply line drops below a predetermined value, the novel device automatically shuts off the flow or passage of fluid from the supply line.

Another important object of the present invention is the provision of a novel means and mechanism combining a low pressure cut-off with a pressure regulator whereby when the pressure in a fluid supply line or system decreases below a predetermined value, the flow of fluid from the supply line is effectively shut off, and when the pressure of the entering fluid increases beyond a predetermined set value the pressure cut-off is opened for the passage of the entering fluid under pressure to the pressure regulator side of the valve assembly. To control the maximum pressure of the fluid permitted to pass or flow through the pressure regulator side and to be discharged therefrom, novel valve-actuated means are provided for maintaining the desired pressure of the fluid being discharged below a predetermined maximum.

Another important object of the present invention is the provision of a novel pressure regulating and controlling device provided with a pair of adjustable valves, one of which controls the passage of the fluid under pressure being supplied and the other controls the discharge of the fluid under pressure from said device. The first of said valves operates at a predetermined setting so that should the pressure of the fluid supplied thereto fall below said setting all flow through the device is automatically shut off, and when the pressure of the fluid in the discharge side rises beyond a predetermined maximum setting, the other valve functions to control the flow to the discharge line.

Although the present pressure regulating device is shown embodied in the discharge line of a compression sprayer for regulating and controlling the discharge of the spray solution at an effective and substantially uniform pressure and thereby assures dispensing a uniform volume and spray pattern, the present invention is not limited thereto but has a much wider application and may be employed in any fluid system or discharge line where the fluid is under pressure and wherever a controlled flow with a positive shut-off is desired or required.

The present invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in side elevation of the present novel pressure regulating device which is shown mounted on a compression sprayer for effectively controlling the discharge therefrom of a liquid under pressure.

Fig. 2 is an enlarged top plan view of the novel pressure regulating device.

Fig. 3 is a view in vertical cross section taken centrally through the device in a plane represented by the line 3 of Fig. 2.

Fig. 4 is a fragmentary view in horizontal cross section taken approximately on the irregular line 4—4 of Fig. 3.

Referring more particularly to the disclosure in the drawing, the embodiment of the present pressure regulating device is shown mounted on a pressure sprayer for controlling the discharge and for regulating the pressure of a liquid to be dispensed. It is to be understood that this disclosure is intended to show but one use or application of the present invention which is capable of use wherever any liquid under pressure is to be adequately controlled.

In the novel illustrative embodiment shown applied to a compression sprayer capable of dispensing various liquids including insecticides, solvents, paints and other sprayable solutions, the liquid to be dispensed is contained within a tank or receptacle 10 adapted to hold a substantial quantity of the liquid spray. To place the liquid in the tank under pressure there is preferably provided a pump 12 having a piston 13 and a manually-actuated piston rod 14 adapted to be reciprocated by grasping the handle 15 of the pump and operating the same. This permits a suitable pressure to be built up in the tank for delivering the liquid under pressure through an outlet tube or conduit 16 depending into the tank with its inlet 17 disposed adjacent the bottom thereof.

A removable closure 18 is provided for a fill opening permitting access to the tank and for supplying liquid thereto.

The upper end of the outlet tube 16 is threaded or attached to the inlet coupling 19 of a housing 21 for the novel pressure regulating device. This inlet coupling is cored to provide an annular chamber 22 to the rear of a disc or diaphragm 23 provided with a rubber or resilient diaphragm valve 24 adapted to seat and seal against an annular or peripheral valve seat 25. This diaphragm valve 24 is spring-biased against this valve seat 25 by means of a coil spring 26 housed within a threaded cup-shaped member 27 adjustably mounted in a threaded screw cap or closure 28 retaining the edge of the disc or diaphragm 23 in anchored position against a peripheral shoulder 29.

One end of the spring 26 abuts and is held in centered position upon an embossment on a button or plug 31 seated against the disc or diaphragm 23, and its other end abuts the end wall 32 of the cup member 27. This end wall is slotted and provided with an aperture 33 opening the space at the rear of the disc or diaphragm 23 to the atmosphere. Compression on the spring 26 may be varied by adjustment of the cup member 27; the latter may be locked in position by a lock nut 34.

At the front of the disc or diaphragm 23 and its resilient or rubber diaphragm valve 24 is a relatively large passage 35 opening into a chamber 36 encompassing the lower end or hollow base 37 of a valve member 38. This valve member 38 is provided with an upstanding pin or reduced head 39 and an outwardly and downwardly flared or tapered and machined valve seating portion 41 merging into the hollow base 37.

The lower open end of the hollow base is adapted to receive and retain a coil or expansion spring 42 spring-biasing the valve member 38 to elevated position with the lower end of this spring seating upon or abutting an adjustable screw cap 43 threaded into the housing 21 and sealing the chamber 36 to the exterior by a sealing ring 44. By adjusting the screw cap 43 the compression on the spring 42 and its lifting force applied to the valve member 38 may be varied.

The chamber 36 is separated from a discharge chamber 45 by means of a transverse wall or divider 46 in the body of the housing 21, the wall being provided with an opening or passage 47 therethrough permitting longitudinal movement of the pin or reduced head 39 of the valve member 38 and with a tapered valve seat 48 about this opening adapted to be engaged by the valve seating portion 41 on the valve member 38. The discharge chamber 45 opens into a discharge port or outlet 49 connected through the outlet coupling 51 to a discharge line for dispensing the liquid from the tank or container 10. When applied to a compression sprayer tank, the discharge line is connected to the outlet coupling 51 and may include a flexible hose having the usual spray nozzle and manually-actuated control valve as disclosed in the copending August H. Pinke application Serial No. 348,638, filed April 14, 1953.

The discharge chamber 45 is separated from an upper chamber 52 by means of a flexible metal diaphragm 53 having its peripheral edge seated upon a shoulder 54 in the housing and retained thereon by the depending threaded end of a screw cap or closure 55. A threaded cup member 56 is adjustably mounted in the screw cap or closure 55 and houses one end of a coil spring 57, the other end of this spring seating upon a button or plug 58 and held in centered position by an embossment 59 on this plug. A lock nut 61 retains the cup member 56 and spring 57 in adjusted position and maintains the desired compression on the spring. An opening 62 in the end wall 63 of the cup member opens the upper chamber 52 to the atmosphere, and this end wall like the end wall 32 of the cup member 27 is slotted to permit its adjustment by a screwdriver or other tool.

In the operation of the present novel device, liquid under pressure enters the inlet 19 from any suitable source of supply. In the illustrative embodiment, this source of supply is shown as a tank 10 for a compression sprayer provided with an outlet tube or conduit 16 coupled to the inlet 19. The liquid entering the housing 21 collects in the chamber 22 and when the pressure in this chamber reaches a value beyond that of the setting on the spring 26, the diaphragm 23 is forced outwardly and its diaphragm valve 24 is opened when unseated from its valve seat 25. As the opening of the diaphragm valve 24 will expose the center area of the diaphragm 23 to the pressure of the entering liquid, the valve will be held open until the pressure of the entering liquid drops below the pressure value or point at which it is set to open. When the pressure drops to the selected shut-off setting, the diaphragm 23 is pressed or forced inwardly by the spring 26 and the diaphragm valve 24 is returned to sealing engagement with the valve seat 25, whereupon the valve positively shuts off the passage of the liquid from the tank 10 or other suitable liquid supply.

The liquid under pressure entering the passage 35 and chamber 36 in the pressure regulator side of the valve 24 cannot escape or discharge through the opening 47 into the discharge chamber 45 and the discharge port or outlet 49 unless the valve member 38 is open. With no liquid pressure in the chamber 45, the spring 57 will force the diaphragm 53 and the valve pin 39 down sufficiently to unseat the flared valve seating portion 41 on the valve member 38 from the valve seat 48, and permit liquid to flow through the opening or passage 47 as soon as the pressure in the tank is sufficient to open the low pressure cut-off valve 24. Liquid under pressure will then flow through the opening or passage 47 and fill the chamber 45 and discharge line to the pressure set on the regulator.

When the pressure rises beyond the predetermined setting, it forces the diaphragm 53 up against the pressure of the spring 57 and the spring-loaded valve member 38 is forced upwardly to closed position and thereby control the flow through the port 47. Thus this novel pressure regulating means permits only the passage or flow of liquid below a predetermined pressure at which the spring 57 and diaphragm 53 are set. As soon as the pressure in the chamber 45 decreases to or below the setting of the spring 57, the diaphragm 53 is forced down and it in turn depresses the valve member 38 to open position in which the liquid under pressure again flows through the port 47.

Assuming the spring-loaded valve 24 and the spring-loaded diaphragm 53 are to be actuated when the liquid under pressure reaches approximately 20 p.s.i., the valve 24 will be retained closed until the pressure of the liquid in the inlet reaches approximately 20 p.s.i. and this valve will remain open until the pressure of the entering liquid is decreased therebelow. If the pressure in the chamber 45 increases beyond approximately 20 p.s.i., the diaphragm 53 will be raised and the valve member 38 with its upstanding pin 39 maintained in contact with the underside of the diaphragm 53 will be elevated to closed position. However, as soon as the pressure is relieved in the chamber 45 and drops below approximately 20 p.s.i., the diaphragm 53 will again be lowered by the spring 57 and quickly depress the valve 38 to open position.

From the above description and disclosure in the drawing, it will be seen that the present pressure regulating device is adapted to be mounted in the discharge line carrying a fluid supply under pressure and comprises a novel low pressure cut-off and a novel pressure regulating means. It is capable of being employed wherever the flow of fluid under pressure is to be controlled, and comprehends (1) means for controlling and holding at a predetermined pressure fluid as it is discharged from the device and (2) should the pressure drop below a predetermined minimum, the device automatically shuts off any fluid likely to pass through the device and enter the discharge line therebeyond.

Having thus disclosed the invention, I claim:

1. Pressure control mechanism connected to the outlet tube of the tank of a compression sprayer having a discharge line provided with a nozzle and means for controlling the pressure and volume of the spray discharge, said mechanism comprising means for controlling the pressure of the spray solution entering and discharging from said mechanism and including a valve body having an inlet and an outlet passage, an annular chamber encompassing said outlet passage and communicating with said inlet, a cutoff valve controlling flow to said outlet passage from said annular chamber, said valve being biased toward closed position by a loading force acting on one side thereof with the other side of said valve being subject to the pressure in said annular chamber and said outlet passage, a chamber connected with said outlet passage into which the spray solution under pressure flows when said valve is open, a second chamber and an outlet to the discharge line for the discharge of the spray solution under pressure, a port connecting said chambers, means for controlling the flow of spray solution under pressure from the first chamber to the second chamber and into the discharge line including a spring-loaded valve and a spring-loaded metal diaphragm controlling the flow through said port of the spray solution under pressure from said first mentioned to said second mentioned chamber and discharge line, said spring-loaded metal diaphragm biasing said second mentioned valve to open position when the pressure of the spray solution entering the second chamber and into the discharge line is below that of the spring-loading of said diaphragm, whereby said first mentioned valve automatically and positively shuts off flow of the spray solution through said mechanism when the pressure of the entering spray solution is below the spring loading of the first mentioned valve, and said second mentioned valve and diaphragm automatically and positively control the maximum pressure of the spray solution being discharged, all combining to insure a constant and uniform discharge pressure.

2. Pressure control mechanism as set forth in claim 1, in which said second mentioned valve consists of an integral valve member having at one end an upstanding pin and at its other end a hollow base with a conical seating surface therebetween, and an expansible spring in said hollow base, said upstanding pin projecting through the port connecting said chambers into contact with said diaphragm and said spring biasing said second mentioned valve to closed position in which the said conical seating surface closes said port.

3. Pressure control mechanism as set forth in claim 1, in which said second mentioned valve consists of a valve member having at one end an upstanding pin and at its other end a hollow base with a conical seating surface therebetween, an expansible spring in said hollow base, said upstanding pin projecting through the port connecting said chambers into contact with said diaphragm and said spring biasing said second mentioned valve to closed position in which said conical seating surface closes said port, means for adjusting the spring-loading of said diaphragm and means for adjusting the spring loading of said second mentioned valve.

References Cited in the file of this patent

UNITED STATES PATENTS

| | | |
|---|---|---|
| 305,966 | Sargent | Sept. 30, 1884 |
| 1,465,654 | Radtke | Aug. 21, 1923 |
| 1,603,112 | Jenkins | Oct. 12, 1926 |
| 2,053,931 | Work | Sept. 8, 1936 |
| 2,150,460 | Riches | Mar. 14, 1939 |
| 2,447,695 | Folke | Aug. 24, 1948 |
| 2,768,643 | Acomb | Oct. 30, 1956 |

FOREIGN PATENTS

| | | |
|---|---|---|
| 431,890 | Great Britain | July 17, 1935 |